US008832574B2

(12) United States Patent
Ostergard et al.

(10) Patent No.: US 8,832,574 B2
(45) Date of Patent: Sep. 9, 2014

(54) APPARATUS AND ASSOCIATED METHODS

(75) Inventors: Toni Patrik Ostergard, Turku (FI); Ilkka Hyytiainen, Espoo (FI); Brian Davidson, Woking (GB); Nigel Richardson, Farnham (GB)

(73) Assignee: Nokia Corporation, Espoo (FI)

( * ) Notice: Subject to any disclaimer, the term of this patent is extended or adjusted under 35 U.S.C. 154(b) by 829 days.

(21) Appl. No.: 12/459,378

(22) Filed: Jun. 30, 2009

(65) Prior Publication Data

US 2010/0333006 A1 Dec. 30, 2010

(51) Int. Cl.
*G06F 3/14* (2006.01)
*G06F 1/16* (2006.01)
*G02B 26/00* (2006.01)
*G06F 3/01* (2006.01)
*G06F 3/044* (2006.01)

(52) U.S. Cl.
CPC ........ *G06F 1/1624* (2013.01); *G09G 2300/023* (2013.01); *G06F 3/1446* (2013.01); *G06F 1/1647* (2013.01); *G06F 1/1637* (2013.01); *G02B 26/005* (2013.01); *G09G 2340/12* (2013.01); *G06F 3/016* (2013.01); *G06F 1/1643* (2013.01); *G06F 1/1615* (2013.01); *G06F 3/044* (2013.01); *G06F 2200/1614* (2013.01); *G06F 1/1616* (2013.01)
USPC ............... 715/768; 715/764; 715/700; 345/4; 345/5; 345/173

(58) Field of Classification Search
CPC .............................. G06F 3/1423; G06F 3/1438
USPC .......................................................... 715/768
See application file for complete search history.

(56) References Cited

U.S. PATENT DOCUMENTS

| 5,808,711 A * | 9/1998 | Suppelsa et al. ................ 349/74 |
| 7,048,422 B1 | 5/2006 | Solomon ....................... 362/503 |
| 7,109,977 B2 | 9/2006 | Durso ........................... 345/173 |
| 7,161,590 B2 * | 1/2007 | Daniels ......................... 345/204 |

(Continued)

FOREIGN PATENT DOCUMENTS

| CN | 101158795 A1 | 4/2008 |
| CN | 201066422 Y | 5/2008 |

(Continued)

OTHER PUBLICATIONS

Eldon et al., GB 2 389 696, Electronic display, Published on Dec. 17, 2003.*
Yahiro et al., WO 2006/112740, Multi-layer display with active and passive matrix display layers, Published on Oct. 26, 2006.*
Eldon et al., GB 2 389 696, Electronic display, Published on Dec. 17, 2003, 24 pages.*

(Continued)

*Primary Examiner* — William Bashore
*Assistant Examiner* — Reza Nabi
(74) *Attorney, Agent, or Firm* — Harrington & Smith

(57) ABSTRACT

An apparatus including a first display configured to be able to display user content and to have an active display state in which said user content can be stably displayed via active powering of the display, and a second display configured to be able to display user content and to have a passive display state in which said user content can be stably displayed without active powering of the display. The apparatus is configured such that the first display is positioned to at least partially overlie and cover the second display to provide a covered region of the second display. The apparatus is also configured such that the content on the second display in the covered region can be viewed through the first display.

15 Claims, 14 Drawing Sheets

(56) References Cited

U.S. PATENT DOCUMENTS

| | | | |
|---|---|---|---|
| 7,170,506 B2* | 1/2007 | Eldon et al. | 345/207 |
| 7,224,324 B2* | 5/2007 | Quist et al. | 345/7 |
| 7,403,190 B2 | 7/2008 | Bathiche | 345/170 |
| 8,446,377 B2* | 5/2013 | Estrada et al. | 345/173 |
| 2002/0044065 A1* | 4/2002 | Quist et al. | 340/815.4 |
| 2004/0021681 A1* | 2/2004 | Liao | 345/702 |
| 2008/0007486 A1* | 1/2008 | Fujinawa et al. | 345/5 |
| 2008/0192013 A1* | 8/2008 | Barrus et al. | 345/173 |
| 2008/0211734 A1* | 9/2008 | Huitema et al. | 345/3.1 |
| 2008/0247128 A1* | 10/2008 | Khoo | 361/681 |
| 2008/0309640 A1* | 12/2008 | Hong | 345/173 |
| 2009/0016078 A1* | 1/2009 | Murray et al. | 362/615 |
| 2009/0295731 A1* | 12/2009 | Kim et al. | 345/168 |
| 2010/0115407 A1* | 5/2010 | Kim et al. | 715/708 |
| 2010/0141689 A1* | 6/2010 | Johnson | 345/690 |
| 2010/0302483 A1* | 12/2010 | Peng et al. | 349/106 |
| 2011/0043435 A1* | 2/2011 | Hebenstreit et al. | 345/5 |

FOREIGN PATENT DOCUMENTS

| | | |
|---|---|---|
| GB | 2 389 696 A | 12/2003 |
| JP | 2004145821 A | 5/2004 |
| WO | WO-03/079174 A2 | 9/2003 |
| WO | WO 2006/112740 A1 | 10/2006 |

OTHER PUBLICATIONS

Yahiro et al., WO 2006/112740, Multi-layer display with active and passive matrix display layers, Published on Oct. 26, 2006, 14 pages.*
"Apple iPhone 3GS—32GB—black (AT&T) Smartphone reviews—CNET Reviews", Product Summary , http://reviews.cnet.com/smartphones/apple-iphone-3gs-32gb/4505-6452_7-3367; Jun. 30, 2009, 20 pgs.
"Motorola Krave™ ZN4", http://www.motorola.com/motoinfo/product/detailsPf.jsp?golobalObjectId=266; Jun. 30, 2009, 2 pgs.
"LG GSM Mobile Phone", LG Global Site, http://www/lge.com/products/model/detail/LG-GD900%20Crystal.jhtml; Jun. 30, 2009, 1 pg.
"Nokia 5330 XpressMusic", Device Details, http://www.forum.nokia.com/devices/5330_XpressMusic; Jun. 30, 2009, 3 pgs.
"Nokia N97—silver (unlocked) Smartphone reviews—CNET Reviews", Product Summary, http://reviews.cnet.com/smarkphones/nokia-n97-silver-unlocked/4505-6452_7-33; Jun. 30, 2009, 9 pgs.
"Nokia 5800 XpressMusic", Nokia USA Product Brochure, http://www.nokiausa.com/find-products/phones/nokia-5800-expressmusic; Jun. 30, 2009, 5 pgs.
http://www.mobildevice.ru/MaryLand-Berkeley-University-elektronnaia-kniga-dva-nezavis . . . , (Jun. 29, 2008), (4 pages).
http://team-madalf.com/lofiversion/index.php?t34663.html, (Dec. 12, 2006), (3 pages).

* cited by examiner

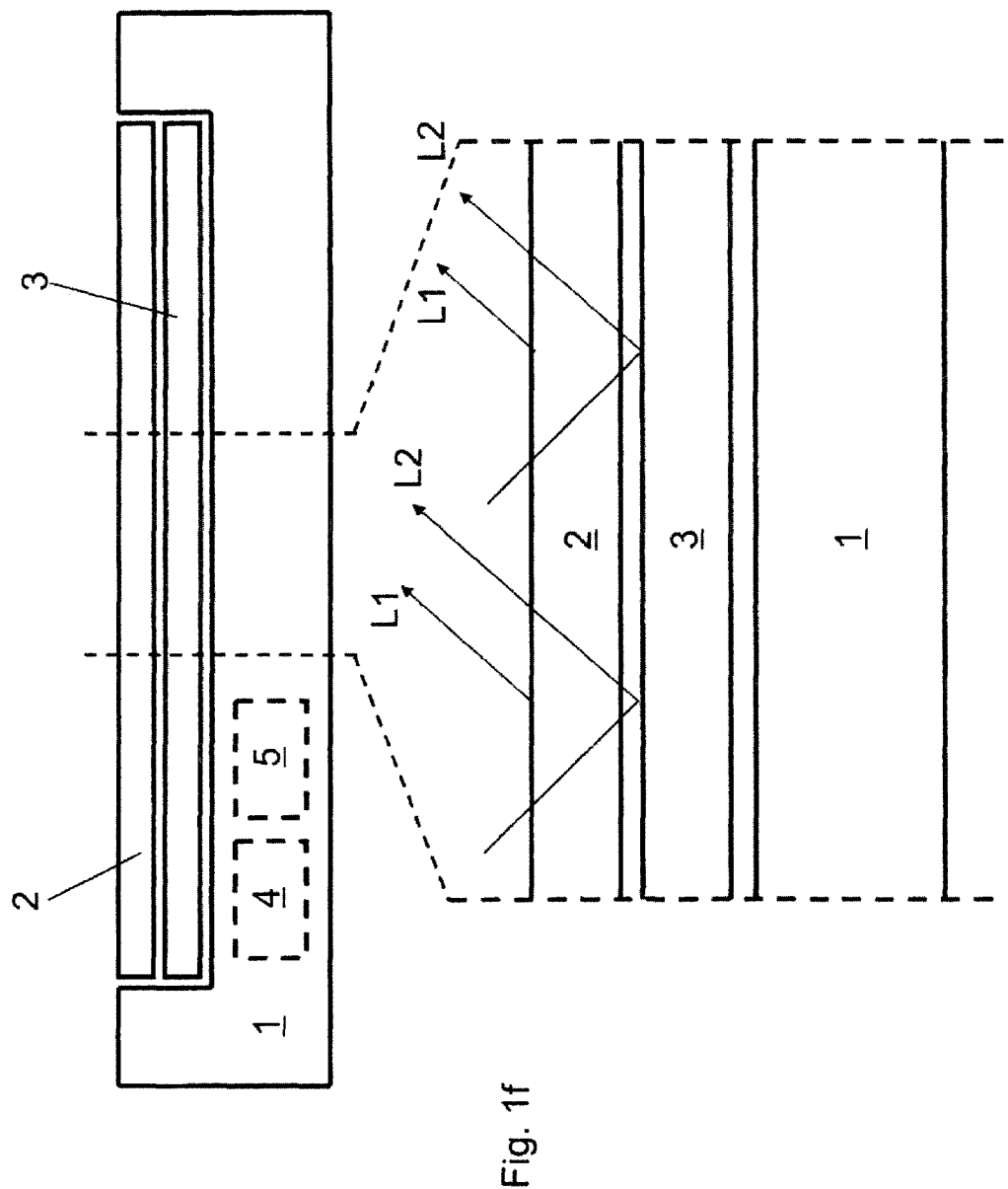

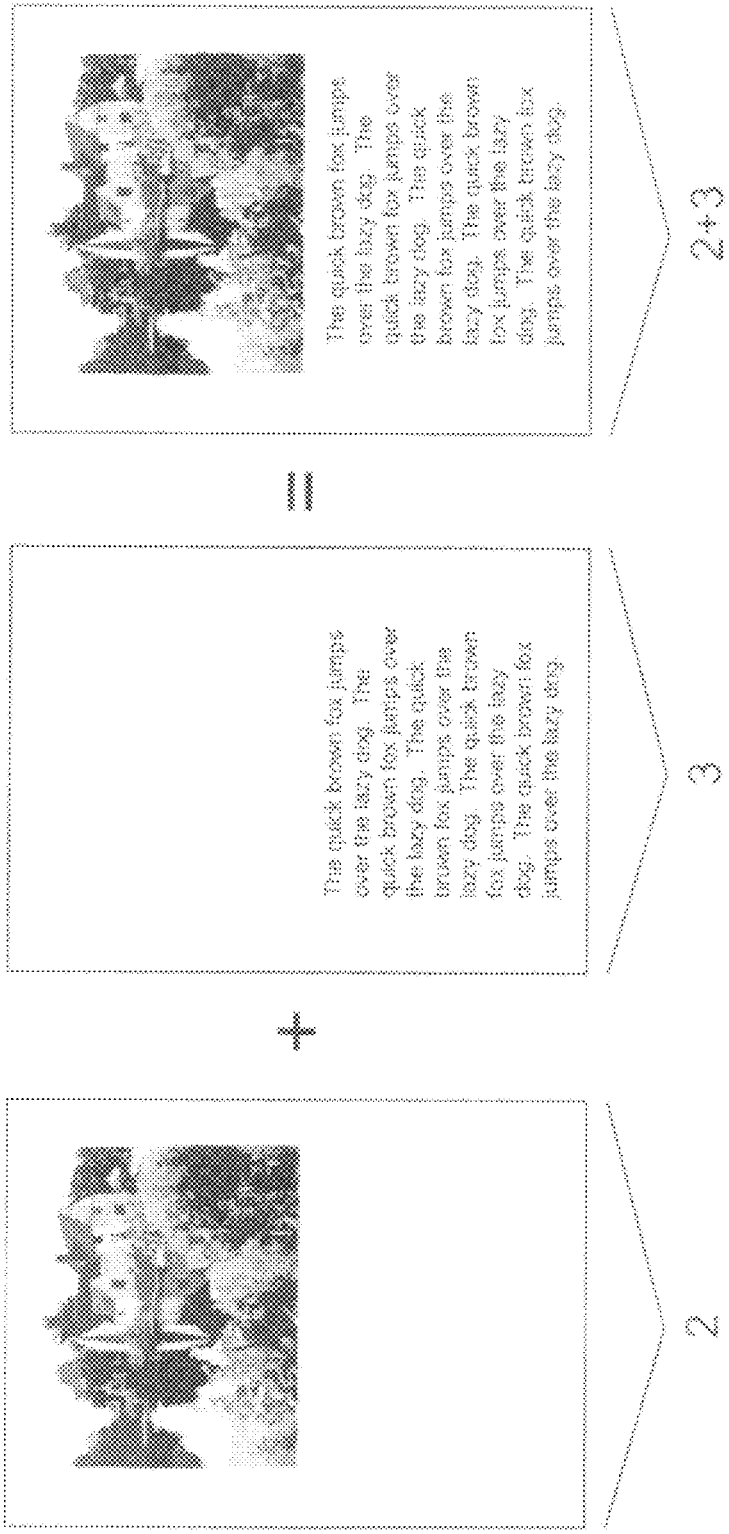

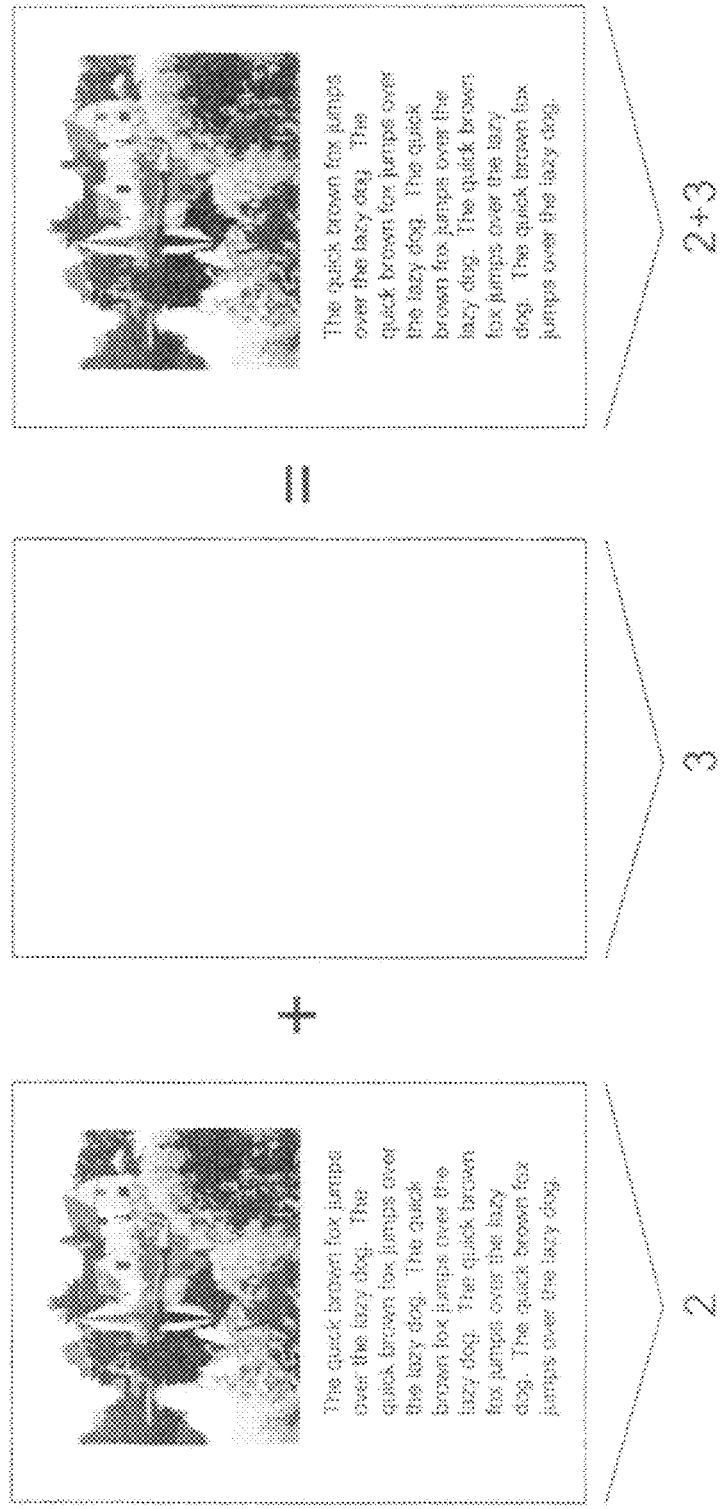

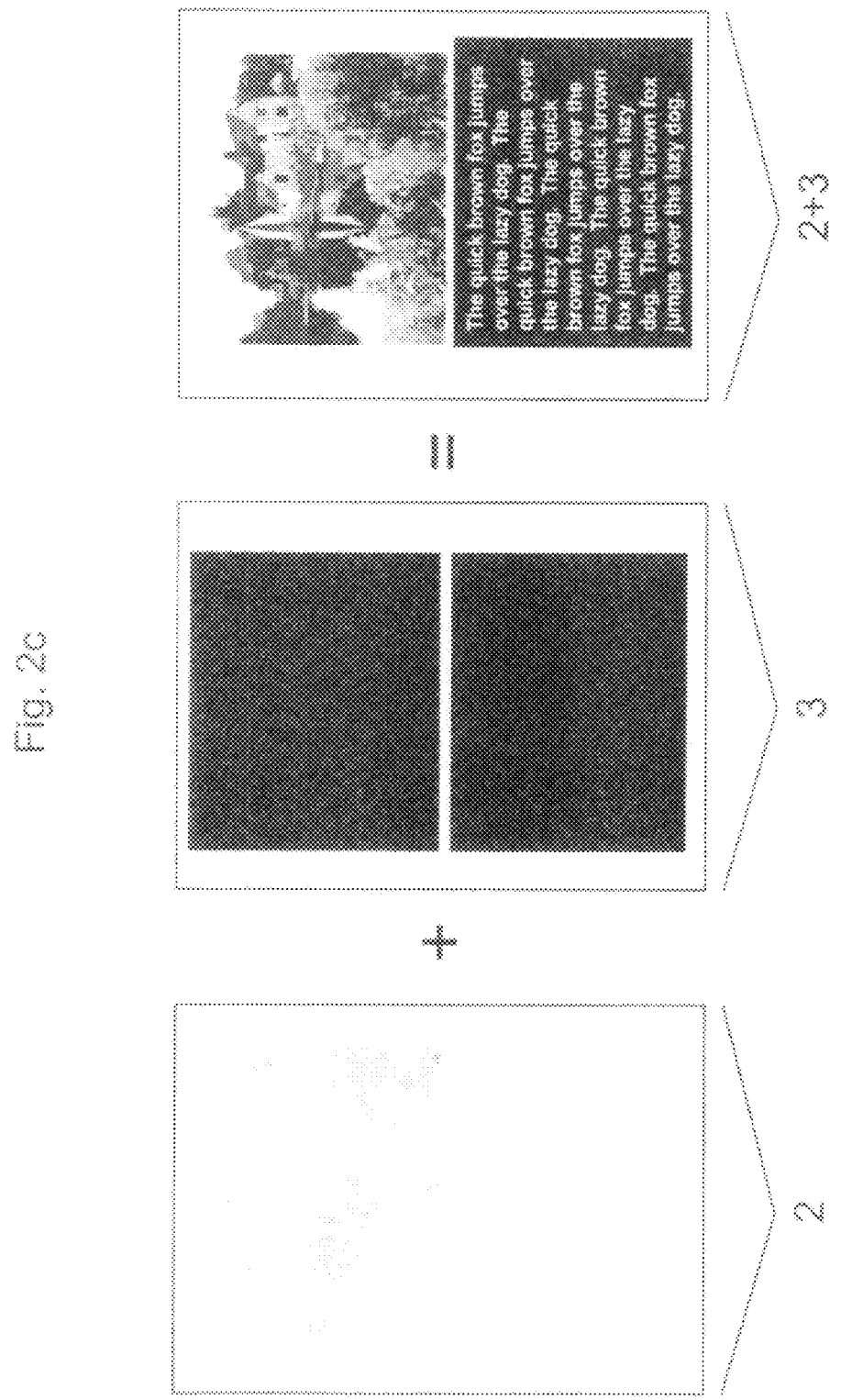

Fig. 2d

[empty frame] 2

+

[text frame with "12.10pm" and repeated "The quick brown fox jumps over the lazy dog."] 3

=

[text frame with "12.10pm" and repeated "The quick brown fox jumps over the lazy dog."] 2+3

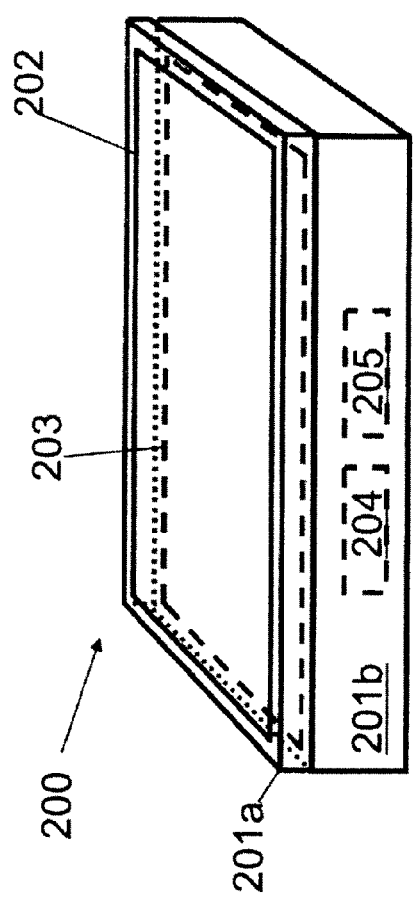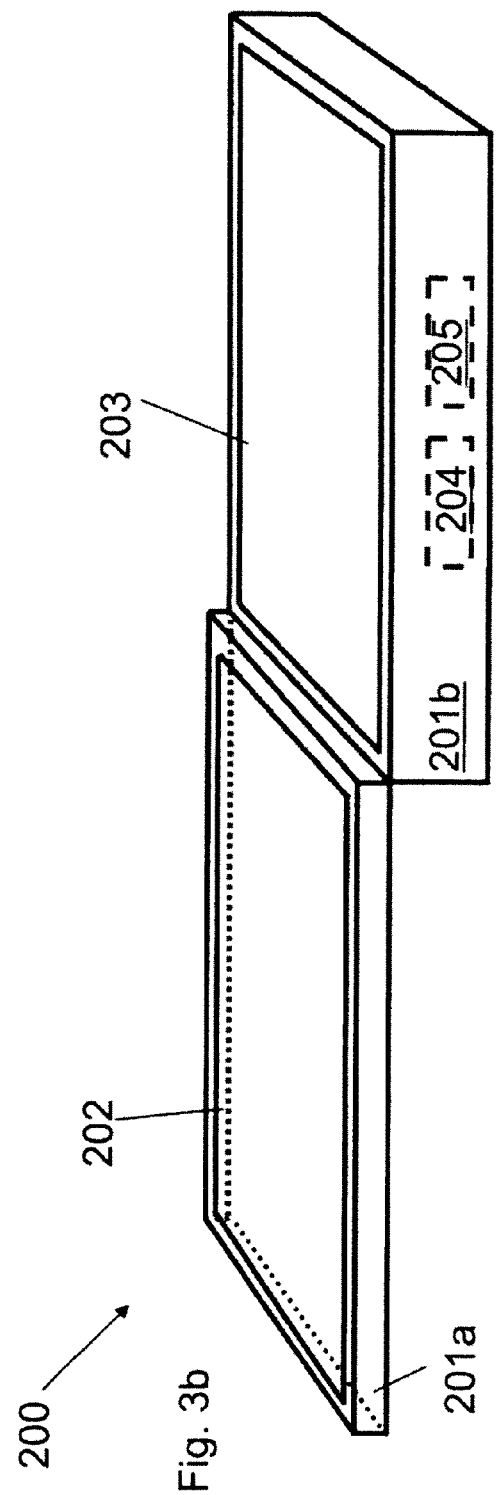
Fig. 3a
Fig. 3b

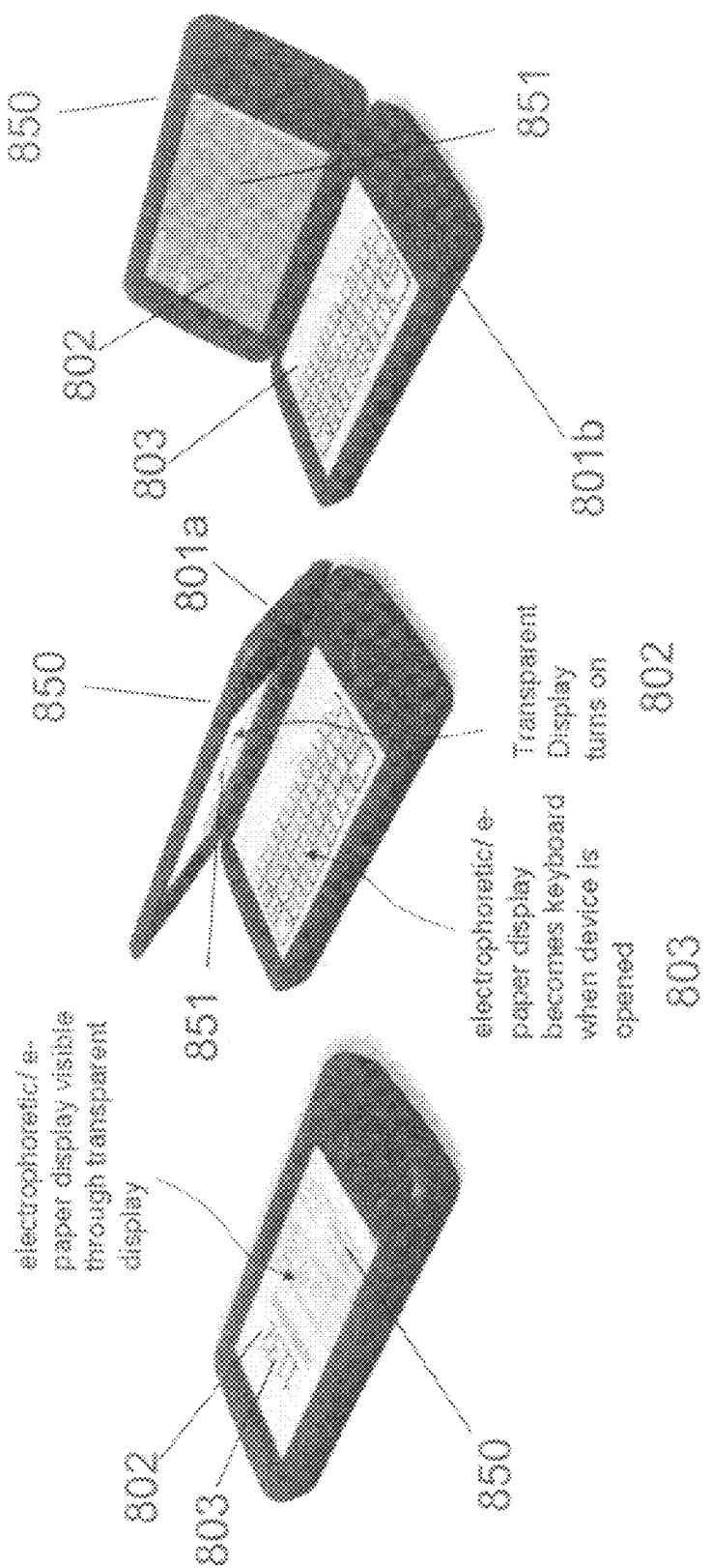

APPARATUS AND ASSOCIATED METHODS

TECHNICAL FIELD

The present disclosure relates to the field of display apparatus and their associated methods, computer programs and devices. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Apparatus/devices such as mobile phones, PDAs, gaming devices, e-book readers, etc typically utilise electronic displays to provide useful information as user content to a user. User content can consist of text, colour/gray-scale images, movies/videos, news/information tickers, etc. These can often be provided via software such as web browsers, e-book reading programs, photo or video editors, etc. This user content provided can typically be changed or varied according to the functionality desired by the user.

Many mobile phones, for example, utilise a single screen/display or single type of screen/display to present all information and user content to a user (see, for example, Motorola Krave touch phone). Such displays are typically active light emitting screens that continuously emit light to provide content to a user (for example, LCD, TFT, EL screens, etc). The active nature of such displays means that they can change their displayed information/content very rapidly, which makes them suitable for displaying dynamic content such as movies, video clips, animations, scrolling text, web browser application, etc. However, these types of screens require a constant steady supply of power to continue providing user content, and the user content to be displayed must constantly be provided to the display to keep the content on screen.

This constant need for power to actively display user content on active light emitting displays is one reason many devices/apparatus have a standby/screensaver mode in which power to the screen is switched off when the device considers that it is not presently being used by a user (for example, mobile phones, computers, laptops, etc). This helps to ensure that power is not being wasted during a period of 'non-use', but is only used when a user may wish to operate the device or view content on the device.

In other devices, such as e-book readers, an electrophoretic screen/display is utilised (also known as electrophoretic paper). The basics of electrophoretic display technology are well known in the art. To date, the only commercially available type of electrophoretic display displays content in black and white, but colour electrophoretic displays are currently being developed. Electrophoretic displays are different to light emitting screens in several different ways. Electrophoretic displays display content via the reflection of ambient light as opposed to emitting their own light (i.e. they do not require a backlight to clearly display their content to a user). Another key difference between these displays and active light emitting displays is that electrophoretic displays do not require a constant application of power and streaming of user content in order to maintain the content on screen. Instead, an initial application of power biases the display to provide particular content (such as static text or an unchanging image) and after this initial application of power the display will stably display that image until another application of power and updated user content biases the display to change the provided content.

In essence, electrophoretic displays do not require power to be continuously applied in order for them to continuously display user content (unlike active displays). This allows electrophoretic displays to display particular content indefinitely once it has initially been configured to provide that particular content.

However, current electrophoretic display technology is not suitable for the display of information/content which needs to be rapidly updated. It takes a comparatively long period of time to alter the provided content from a first state to a second state (in comparison with active displays).

GB2389696 describes a hybrid display that has active display elements and reflective display elements, the reflective elements being positioned to overlie and to be adjacent to the active elements. The underlying active display elements are not viewable through the overlying reflective elements. The document also teaches that the displays provide for the same user information.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
a first display configured to be able to display user content and to have an active display state in which said user content can be stably displayed via active powering of the display; and
a second display configured to be able to display user content and to have a passive display state in which said user content can be stably displayed without active powering of the display, wherein the apparatus is configured such that the first display is positioned to at least partially overlie and cover the second display to provide a covered region of the second display and is also configured such that the content on the second display in the covered region can be viewed through the first display.

As the first display (at least partially) overlies and covers the second display and is also configured to allow the content on the second display to be viewed through the first display, this can enable content on each of the respective displays to be viewed simultaneously in the same area.

Advantageously, an apparatus is provided which can make use of different display types with different power requirements to thereby provide for different/same user content. Furthermore, the different display types can be used singly/in combination to provide user content.

The first display may be configured to be transparent/translucent to thereby allow the content in the covered region of the second display to be viewable through the first display. The first display may be configured to have one or more transparent regions and/or one or more translucent regions that allow content in the covered region of the second display to be viewable through the first display.

The first display may be configured to have one or more regions that are positioned to overlie and cover the second display. Some of these regions may be configured to be transparent, whilst some may be configured to be translucent. Still other regions of the first display may also be configured to be opaque such that the regions of the second display that they cover are not viewable through these regions of the first display. By configuring certain regions to have a certain optical state (i.e. transparent/translucent/opaque) it is possible to allow for select regions of the second display to be viewable through the first display and for others regions of the second display to not be viewable through the first display.

The first display may comprise, or be, one or more displays selected from the following: LCD, TFT, LED, EL, and/or OLED. The first display may be any type of display that is able to rapidly update displayed content.

The second display may comprise, or be, an electrophoretic display. The second display may also comprise, or even be, an electrowet or electrowetting display. The second display may be any display that allows for display of content via reflection of ambient light instead of light emission. In some embodiments, the second display may even be a display type that is capable of light emission.

The apparatus may also comprise a backlight configured to cause the content provided on the first display to be illuminated by the backlight. The backlight can allow for improved viewability of the content provided on the first display. The backlight may also be configured to be usable to provide further light for reflection off the second display, to thereby also enhance the viewability of the content provided on the second display.

The first and second displays may be configured to display different user content. The first display may be configured to provide for one type of content whilst the second display may be configured to provide for another type of content. The first display, for example, can be used to provide actively changing colour content, whilst the second display can be used to provide text.

The two displays may provide for similar content, or even identical content. The two displays could, for example, be configured to provide the same content to enhance the viewability of the overall content being provided. As another example, one of the displays could provide just some or all of the same content provided by the other display.

The apparatus may be configured such that the user content of the second display in the covered region contrasts/is complementary to the user content of the first display to improve the viewability of the composite user content. This can allow for the second display to contrast the content provided by the first display to some extent to thereby enhance the viewability of the content provided on the first display.

The apparatus may be configured such that user content of the second display in the covered region is viewable through the first display, the user content of both displays thereby being viewable together to provide for composite user content.

The content on the two displays is viewable simultaneously by the above arrangement. As such their respective provided content can provide overall perceived content to a user that is actually a composite of the two sets of content. This provides the above-mentioned composite content.

The composite user content may comprise substantially dynamic user content and/or substantially static user content, the first display being configured to be able to provide at least the substantially dynamic user content, the second display being configured to be able to provide the substantially static user content. This can allow for a division of the total user content to be provided between two displays.

Dynamic user content is substantially different from static user content. Dynamic user content is content that can be considered to be actively changing from one moment to the next, or requires rapid updating on a display providing this content (e.g. such as movies, clips, animations, news/information tickers, etc). This type of content is "dynamic" due to its constantly changing nature. This type of content may also be "rich" user content, as active displays are very versatile and capable of displaying content that is colourful and rich. The first display is most suited for displaying this type of content, at least in part because the active display has little difficulty in displaying rapidly changing content.

Static content is different from dynamic content. Static user content is content that does not change much over time and is comparatively more or less unchanging, (such as text on a page, stationary images, backgrounds, etc), unlike dynamic user content. This type of content can be called "static" due to its relatively constant and unchanging nature. The second display is most suitable for displaying this type of content, at least in part because it does not require constant application of power to keep content displayed.

The first display may be configured to provide at least substantially dynamic user content selected from the list of: colour images, videos, motion clips, and/or information tickers, and
   wherein the second display is configured to provide substantially static user content selected from the list of: unchanging images, text, backgrounds, textures, a clock face or display, e-book pages, and/or web browsers.

The apparatus may be configured to route specific types of user content to a specific display, such as dynamic content to the first display, and static content to the second display.

The apparatus may be configured to comprise a power saving mode in which only the second display is configured to provide user content, the second display being configured to display only static user content in its passive display state to thereby save power when providing said static user content. In this power saving mode, the first display is not utilised for providing content. As the second display has a passive display state in which power is not required to continue to provide the user content, this means that there is the option of continually displaying only static user content to save power, instead of requiring power when using the first display. As the first display is not utilised, it can be turned off, or made to go blank.

The apparatus may be configured to comprise an active display mode in which the first display is configured to provide both dynamic and static user content to be displayed in its active display state to thereby provide for active updating of the user content to be displayed. As the first display is active, it can be easily and rapidly updated to alter the provided content. This means that there is the option of providing all user content to the first display to provide for rapid updating of all user content during use.

The apparatus may be configured to comprise a hybrid active display mode in which:
   the dynamic content is displayed via the first display in its active state to thereby provide for active updating of the dynamic user content to be displayed, and the static content is displayed via the second display in its passive display state to also save power.

The apparatus of the first aspect may comprise a first closed configuration defined by the positioning of the first display to at least partially overlie and cover the second display, and the apparatus may also comprise a second open configuration, the apparatus being configured such that, when in the second open configuration, the first display is positioned to be moved away from the second display to provide a revealed region of the second display to allow the content of the second display in the revealed region to be directly viewable.

This can allow for a further configuration of the apparatus in which the displays are moved apart. The displays can then, for example, be used independently, or used together to provide for an increased viewing area, or they can be used interdependently to provide a particular type of user content.

The apparatus may be configured such that the first and second displays can be moved away from one another by one or more of: relative sliding, rotation, folding, or separation.

The apparatus may also comprise additional further configurations (for example, a third, fourth, fifth, sixth, etc, configuration) defined by positioning/movement of the two displays relative to one another. For example, there may be configurations in which there is still some overlap between the two displays, or configurations where the displays are adjacent to each other, or configurations in which the displays are substantially separated and moved apart from each other. These configurations may define different modes of operation of the apparatus. For example, where the apparatus is separated into first and second displays the apparatus may enter a first operational mode, whilst when the first display is positioned to be adjacent to the second display the apparatus may enter a second operational mode, etc.

The apparatus may also comprise additional displays that may be moved/positioned relative to the first and second displays, or even moved/positioned relative to other displays.

The apparatus may be configured such that:
in the first configuration, the first display is also configured to be able to receive touch user input; and
in the second configuration, the second display is also configured to be able to receive touch user input.

By providing for touch user input (regardless of whether this is linked to configurations of the apparatus), the displays can be simultaneously used to provide for user input to the apparatus. This user input can be used to operate the apparatus, for example, by changing the user content, or operating/selecting modes of the apparatus.

The apparatus may be configured such that:
in the first configuration, the first display is also configured to be able to receive touch user input, and/or
in the second configuration, the first and/or second display is also configured to be able to receive touch user input.

The apparatus may be configured such that, in the second configuration, the second display is configured to be able to receive touch user input via a displayed QWERTY and/or an alpha-numerical keypad.

The first and second displays may be configured such that they can be moved apart or away from one another to provide a second configuration in which the second display is directly viewable, in that the user content is not viewed through the first display but is revealed and uncovered.

In a first aspect, there is provided an apparatus comprising:
a first means for displaying user content that is configured to be able to display user content and to have an active display state in which said user content can be stably displayed via active powering of the first means for displaying user content; and
a second means for displaying user content that is configured to be able to display user content and to have a passive display state in which said user content can be stably displayed without active powering of the second means for displaying user content, wherein the apparatus is configured such that the first means for displaying user content is positioned to at least partially overlie and cover the second means for displaying user content to provide a covered region of the second means for displaying user content and is also configured such that the content on the second means for displaying user content in the covered region can be viewed through the first means for displaying user content.

In a further aspect, there is provided a method of assembly of an apparatus, the apparatus comprising:
a first display configured to be able to display user content and to have an active display state in which said user content can be stably displayed via active powering of the display; and
a second display configured to be able to display user content and to have a passive display state in which said user content can be stably displayed without active powering of the display, wherein the apparatus is configured such that the first display is positioned to at least partially overlie the second display to provide a covered region of the second display and is also configured such that the content on the second display in the covered region can be viewed through the first display,
the method comprising:
assembling the apparatus to provide for a position where the first display at least partially overlies the second display to provide a covered region of the second display such that the content on the second display in the covered region can be viewed through the first display.

In a further aspect, there is provided a portable electronic device for displaying user content comprising the apparatus of the first aspect.

In a still further aspect, there is provided an e-book device for displaying text-based user content comprising the apparatus of the first aspect.

The apparatus may be configured to provide static user content such as text in an e-book reader embodiment, or an unchanging background in a standby mode, or a clock in a screensaver mode, etc.

In yet another aspect, there is provided a computer readable medium comprising executable computer code stored thereon, the code being configured to, when run, perform a method of controlling the user content to be displayed on displays of an apparatus, the apparatus comprising:
a first display configured to be able to display user content and to have an active display state in which said user content can be stably displayed via active powering of the display; and
a second display configured to be able to display user content and to have a passive display state in which said user content can be stably displayed without active powering of the display, wherein the apparatus is configured such that the first display is positioned to at least partially overlie the second display to provide a covered region of the second display and is also configured such that the content on the second display in the covered region can be viewed through the first display, the method comprising:
controlling the user content to be displayed on the first and second displays.

In a further aspect, there is provided an apparatus comprising a first light emitting display configured to be able to display user content that is also configured to at least partially overlie a second reflective display configured to be able to display user content, and wherein the apparatus is configured such that the user content on the second reflective display is viewable through the first display.

The first light emitting display of the aspect immediately above may be configured to have an active display state in which said user content can be stably displayed via active powering of the display The second reflective display of the aspect immediately above may be configured to have a passive display state in which user content can be stably displayed without active powering of the display.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

FIG. 1b shows an isometric view of the first display of the apparatus shown in FIG. 1a.

FIG. 1c shows an isometric view of the second display of the apparatus shown in FIG. 1a.

FIG. 1f shows a cross section and nature of operation of the first and second displays of the apparatus shown in FIG. 1a.

FIG. 2a shows how the content provided by the respective displays sums to provide composite user content, where the first display provides dynamic user content and the second display provides static user content.

FIG. 2b shows how the content provided by the respective displays sums to provide composite user content, where the first display provides both the dynamic and static user content.

FIG. 2c shows how the content provided by the respective displays sums to provide composite user content where the first display provides both dynamic and static user content and the second display provides static user content that contrasts the content provided by the first display.

FIG. 2d shows how the content provided by the respective displays sums to provide composite user content where only static user content is provided, and the second display provides this static user content.

FIG. 3a shows a first configuration of an apparatus according to a second embodiment.

FIG. 3b shows a second configuration of the apparatus according to the second embodiment.

FIG. 8 illustrates a foldable variation of the second embodiment.

DESCRIPTION OF SPECIFIC ASPECTS/EMBODIMENTS

Figure 1A:
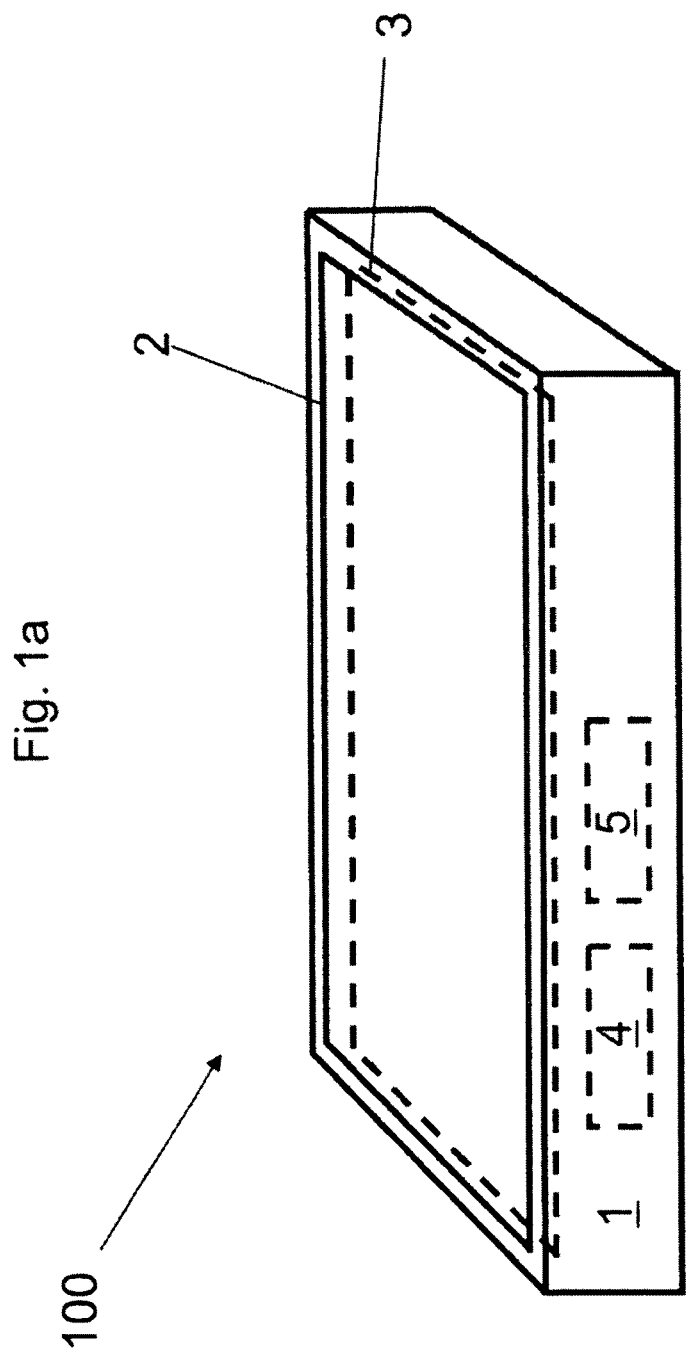
FIG. 1a shows an isometric view of an apparatus providing first and second overlapping displays according to a first embodiment.

In one or more embodiments described herein, there is provided an apparatus comprising a first display and a second display. The first display is configured to be able to display user content and to have an active display state in which said user content can be stably displayed via active powering of the display. The second display is configured to be able to display user content and to have a passive display state in which said user content can be stably displayed without active powering of the display. The apparatus is configured such that the first display is positioned to at least partially overlie and cover the second display to provide a covered region of the second display. The apparatus is also configured such that the content on the second display in the covered region can be viewed through the first display.

This allows for the simultaneous viewing of the content provided by the first display and the content provided by the second display in the covered region, despite the second display being (at least) partially 'covered' by the first display. This covered region of the second display in conjunction with the overlying region of the first display is a display area formed by the overlapping of the two displays that can be used to display the content of the two displays in the same area. A great number of advantages can be achieved using this arrangement, by combining the unique strengths of both displays in this area.

For example, the first display is an actively powered display. This display is suitable for providing content that needs to be rapidly updated (for example, video clips). The second display is a passively powered/operated display. This is suitable for providing content that doesn't need to be rapidly updated (for example, text on a page) and maintaining such content without drawing additional power. The first display can therefore be suitably used to provide a video clip, whilst the second display can be suitably used to provide text to be displayed. As the two displays overlap, this provides for (what would be perceived by the user) to be total user content provided by the summation of the content of both displays in the overlapping region of the displays.

As the displays are adapted/suitable for different functions, this arrangement can be used to help optimise the overall display operation of the apparatus. If the first display were to display the text (which would not change substantially over time) then power would be essentially wasted whilst maintaining the unchanging text on screen. Similarly, the second display would not be suitable, or perhaps even capable, of adequately displaying the moving image in that it may be extremely delayed or may not display correctly. Therefore, the abovementioned display arrangement helps to reduce wasted power and time by utilising the distinct advantages of each display.

The skilled person will appreciate that there are still further advantages that this display arrangement can provide. These will be further explained in the following sections.

In at least one further embodiment, the apparatus has a first closed configuration defined by the positioning of the first display to at least partially overlie and cover the second display. The apparatus also comprises a second open configuration in which the first display is positioned to be moved away from the second display to provide a revealed region of the second display. This positioning in the second configuration allows the content of the second display in the revealed region to be directly viewable. This allows the apparatus to provide a single display area with the advantages of both display types in a first configuration, or to be in a second configuration that allows both displays to be separately operable.

We will now describe the first embodiment of the invention with reference to FIG. 1a.

According to the first embodiment, there is provided an apparatus 100. The apparatus 100 comprises a housing 1, a first display 2, a second display 3, a processor 4 and a power supply 5.

Figure 1B:
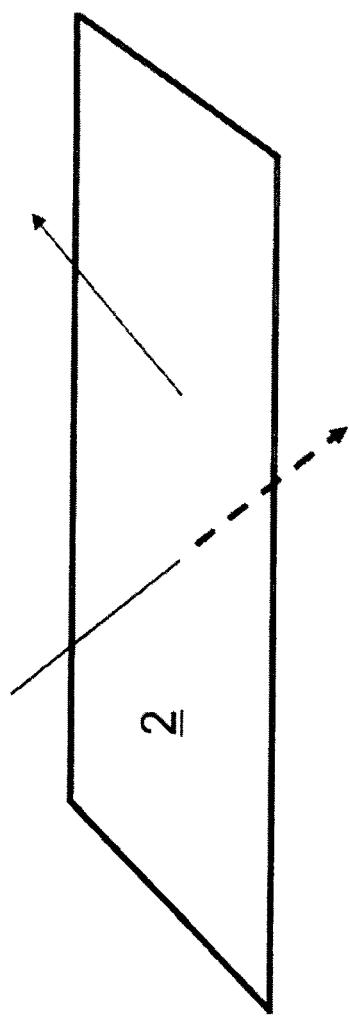

We will now describe the first display 2 with reference to FIG. 1b. The first display 2 is an active light emitting display that is also completely transparent. In this embodiment it is a transparent LCD capacitive touch screen. As the first display 2 is transparent, light can pass straight through the display 2. This is important so as to allow light to reach the second display 3 that will be underneath the first display 2 (described below). In other embodiments it will be appreciated by the skilled person that only portions of the first display 2 will be transparent, or that the display may be translucent to some extent, or that it may be some combination of the above.

The first display 2 is capable of actively displaying coloured user content and is also provided with a backlight (not shown) that enables its displayed content to be emitted as light to a user. As the first display 2 is transparent, it is useful for the display 2 to also be an active display so that it can actively emit light when displaying content so that such content can actually be viewed by a user. In this embodiment the display 2 is an LCD screen, but in other embodiments it may be a TFT screen, LED screen, (transparent) OLED screen, etc, or any other type of active display. It should be noted that some types of light emitting display (for example, transparent OLED/TOLED displays) do not have backlights as they naturally emit light when operational. However, in some embodiments they may still be provided with a backlight to enhance the viewability of the first display 2.

The first display 2 is also capable of receiving touch user input via its capacitive touch properties. Such touch screens are well known in the art. The skilled person will also appreciate that other types of touch technology can be used instead, or even in combination with the capacitive touch technology.

The first display 2 also comprises electrical connections (not shown) that are suitable for electrically connecting the first display 2 to the processor 4 and power supply 5. In this embodiment these electrical connections are conductive wires, but in other embodiments they can be conductive tracks, printed wiring boards (PWB), printed circuit boards (PCB), or even wireless connection (Wi-Fi, Bluetooth™, etc).

In this embodiment, the first display 2 is rectangular in shape and very thin (on the order of micrometers). The skilled person will appreciate that in other embodiments the first display 2 may be a variety of other shapes and dimensions (for example, length width and depth, also in area). For example, the first display 2 may be circular, elliptical, triangular, square, polygonal, or even some other irregular shape.

Figure 1C:
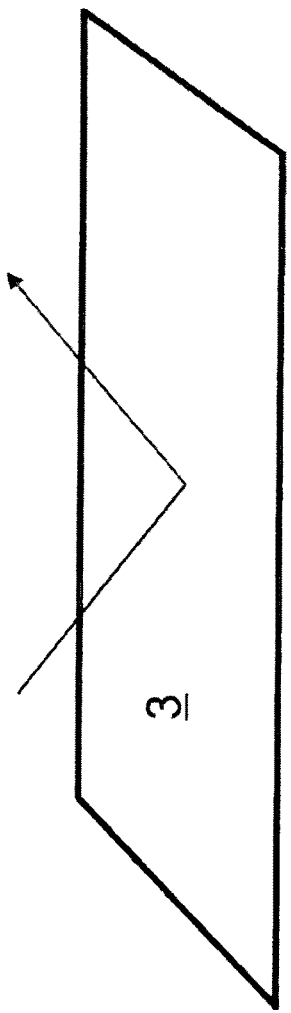

We will now describe the second display 3 with reference to FIG. 1c. The second display 3 is a passive reflective display that is opaque. In this embodiment it is an opaque electrophoretic screen that is grey (or even white) in its unbiased state (i.e. when no content is displayed). In other (or future) embodiments it will be appreciated by the skilled person that the second display 3 may be a colour display (colour electrophoretic displays are currently in development, whilst colour reflective electrowet displays do exist), or that it may be translucent to some extent (or in some regions) rather than opaque. In still other embodiments, cholesteric displays may also be used.

The second display 3 is suitable for displaying greyscale user content, but is not backlit (unlike the first display 2). The non-transparent nature of the second display 3 enables its provided user content to be visible to a user by reflection of ambient light off of the second display 3. In some embodiments, the second display 3 is also provided with a backlight, or may even share the backlight of the first display 2. This is so that when the backlight is emitting light, this light can reflect off of the second display 3 to enhance the viewability of the second display 3 when in use.

The second display 3 also comprises electrical connections (not shown) that are suitable for connection to the processor 4 and power supply 5.

In this embodiment, the second display 3 is rectangular in shape and has a depth/thickness on the order of micrometers). It should be noted that (at least in this embodiment), the second display 3 is configured to be shaped and dimensioned to be the same shape and area as the first display 2. This is so that when the apparatus is assembled, the first display 2 can be positioned so as to overlie the second display 3 completely such that they provide what can be considered to be a single display area from a user's perspective. In other embodiments it will be appreciated by the skilled person that the second display 3 may be shaped and dimensioned differently to the first display 2 (such possibilities have already been discussed above in relation to the first display 2).

In other embodiments described herein it will be appreciated by the skilled person that the second display 3 may be shaped and dimensioned differently to the first display 2 such that it is larger/smaller than the first display 2, or even to be a different shape to the second display 3. For example, the displays 2, 3 may be relatively configured such that the second display 3 is only partially covered by the overlaid first display 2, or even such that the first display 2 is substantially larger than the second display and can cover the entirety of the second display 3.

Figure 1D:
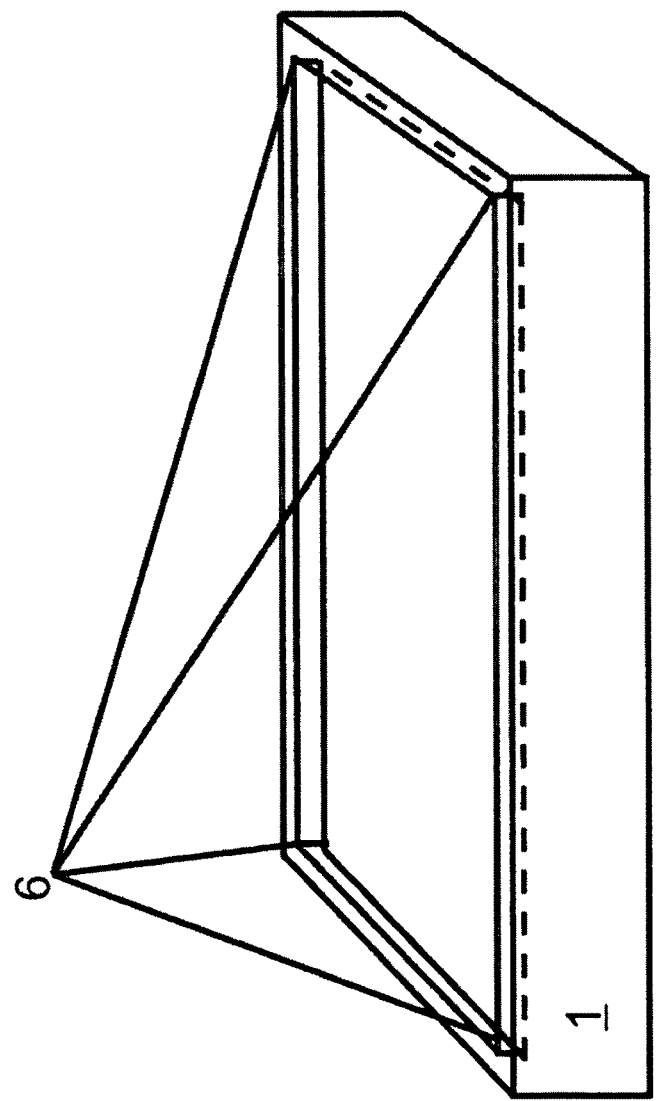
FIG. 1d shows an isometric view of the housing of the apparatus together with the comprised aperture.

We will now describe the housing with reference to FIG. 1d. The housing 1 is a cuboidal casing formed via injection moulding of thermoset resin. The housing 1 is configured to be cuboidal in shape, specifically being shaped and dimensioned to be slightly longer and wider than the dimensions of the first and second displays 2, 3 (relative to FIG. 1a), and also to be substantially deeper than height of the combined first and second displays 2, 3 (also relative to FIG. 1a). The housing 1 has an aperture 6 in the top face of the housing 1. The aperture 6 is configured to be shaped and dimensioned to be complementary to the first and second displays 2, 3 in combination. This is so that the aperture 6 is capable of receiving and housing the first and second displays 2, 3 when the apparatus is assembled. Specifically, the aperture 6 in the top face of the housing 1 has rectangular opening whose dimensions match those of the two displays 2, 3, and a depth that allows both displays to be placed within the aperture 6.

The aperture 6 also has small protrusions/rims (not shown) on the walls of the aperture configured to receive the respective displays 2, 3. There is a first rim that runs all the way around the walls of the cavity near the bottom of the cavity, and a second rim that runs all the way around the walls of the cavity near the top of the cavity. This is so that, during assembly, the displays 2, 3 can be inserted into the aperture, the second display 3 coming to rest on the first (bottom) rim, and the first display 2 coming to rest on the second (top) rim. These rims are positioned such that there will be a gap between the two displays 2, 3 when they are positioned on the rims. The first rim is also positioned so that the first display 2, when mated with the first rim, is flush with the top face of the housing 1. It should be noted that during assembly of certain embodiments where one or both of the displays have a backlight, the backlight of either or both of the displays 2, 3 can be positioned between the two displays 2, 3 so as to provide for backlighting of the first display 2 as well as reflection of light off of the second display 3.

The skilled person will appreciate that there are other possible ways to configure the aperture to receive the displays 2, 3. For example, the rims may just be spaced out protrusions/lugs rather than complete rims, or the rims may be positioned such that there is no gap between the stacked displays 2, 3. In other embodiments, there may be only one rim for the second display 3 and the first display 2 can merely be stacked on top of the second display 3. Other variations may also allow for the first display 2 to be positioned such that it is sunk below the top face of the housing 1 when assembled into the apparatus 100.

The housing 1 also comprises additional internal cavities (not shown) dimensioned to receive the processor 4 and the power supply 5. This is so that the processor 4 and power supply 5 can be housed within the housing 1 of the apparatus 100. The housing also comprises connection channels (not shown) leading from the aperture 6 to these cavities. This is so that the electrical connections of the displays 2, 3 can be connected to the processor 4 and the power supply 5 once installed in the aperture 6.

The processor 4 is, in this embodiment, an Application Specific Integrated Circuit (ASIC). This is an integrated circuit that is tailored to be suitable for the task of providing content to the first and second displays 2, 3 via the electrical connections of the displays 2, 3 to be connected to the processor. The processor 4 also comprises its own electrical connections for connection to the power supply 5. In other embodiments, the processor 4 may actually be a multipurpose processor that is capable of performing many other tasks, or it may be just one processing chip of many within the apparatus 100.

The power supply 5 is an internal rechargeable battery. In this embodiment the battery is a rechargeable type battery (such as a NiMH battery or other rechargeable types), but in other embodiments it may be a normal non-rechargeable battery (for example an alkaline battery) or the like, or even a fuel cell. In this embodiment, the power supply 5 also comprises power connections (not shown) that enable the battery to be connected to an external power source (not shown) for recharging the battery. In other embodiments the battery may in fact be removable or replicable.

It will be appreciated by the skilled person that, in further embodiments, other types of power supply may be utilised to provide power to the apparatus. For example, the power supply 5 may in fact just be power connections to enable the apparatus to be connected to an external power source such as a wall socket or USB cable for external powering of the apparatus.

We will now describe the assembly of this embodiment.

The processor 4 and power supply 5 are first installed into their corresponding cavities within the housing 1. This is to ensure that when the first and second displays 2, 3 are assembled into the apparatus, they can be connected to the pre-installed processor 4 and power supply 5 via the electrical connections of the displays 2, 3.

The second display 3 is placed into the aperture 6 of the housing 1 to mate with the first (bottom) rim of the aperture 6. The second display is then connected to the processor 4 and the power supply 5 via its comprised electrical connections. This allows the processor 4 to control the user content provided by the displays 3 and also enables the power supply 5 to supply the necessary power to the display 3 to provide said user content controlled by the processor 4. The display 3 is then glued into place along the first rim.

The first display 2 is then placed into the aperture 6 of the housing 1 to mate with the second (top) rim of the aperture 6. The first display is then connected to the processor 4 and the power supply 5 via its comprised electrical connections. This allows the processor 4 to control the user content provided by displays 2 and also enables the power supply 5 to supply the necessary power to the display 2 to provide said user content controlled by the processor 4. The display 2 is then glued into place along the second rim.

In other embodiments, the first display 2 is positioned to completely and precisely overlie the second display 3 by virtue of their identical shaping and dimensioning whilst the displays 2, 3 are still separate from the housing 1. The stacked first and second displays 2, 3 are then installed into the aperture 6 of the housing 1 by virtue of the complementary shaping of the aperture 6.

Figure 1E:
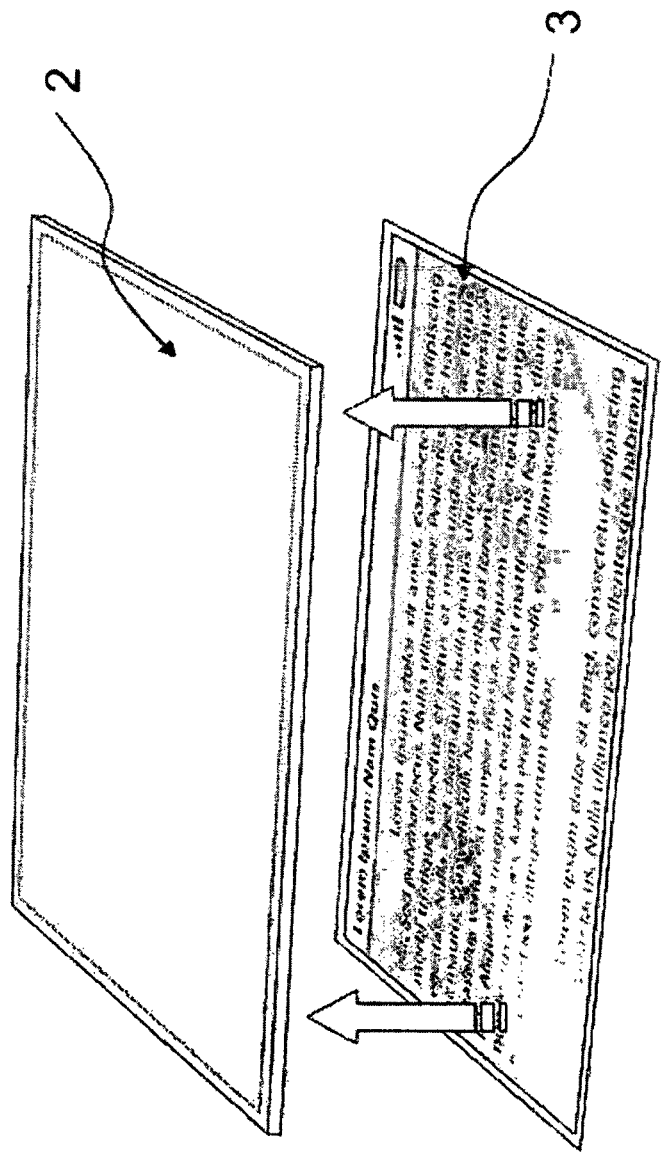
FIG. 1e shows an isometric view of the first display being overlaid over the second display.

We will now describe the functionality of this embodiment with reference to FIGS. 1e & 1f.

As can be seen from FIG. 1e and the zoomed-in section of FIG. 1f, the first display 2 overlies the second display 3. As the first display 2 is an active light emitting display, it emits light representative of its content to be provided for viewing by a user. This is signified by the emission line L1.

Now, the second display 3 does not emit its own light, but requires ambient light to reflect off of its top display surface to cause the content it displays to be viewed by a user. As the first display 2 is transparent, this allows for ambient light (light rays represented by emission line L2) to penetrate through the first display 2 overlying the second display 3, to reflect off of the display surface of the second display 3, and be returned back through the first display 2 to a user for viewing.

This arrangement allows the first display 2 to provide its content via emission of light, whilst also allowing the second display 3 to receive and reflect the ambient light necessary to display its content to a user. Thus, the content of both displays 2, 3 can be viewed at the same time, despite the first display 2 covering the second display 3. This combination/overlaying of one display's content over the other display's content can be considered to provide what we have called "composite user content", i.e. provided content that is a composite of two constituent components of content provided by the different displays. This will be discussed in more detail below.

It should also be noted that, as the first display 2 is completely transparent, the entirety of the second display 3 and the entirety of its displayed content is visible at the same time as the content of the first display 2 (unless partially or totally obscured by content provided on the first display). This can allow the apparatus 100 to display content to be provided in a plurality of different ways. This can also allow the apparatus to provide a plurality of different operational display modes. These will now be discussed with reference to FIGS. 2a-2d.

In FIG. 2a, the apparatus 100 is operating in a hybrid display mode. In this mode, composite user content is to be provided by the combination of the content provided by the first and second displays 2, 3. In this embodiment, the composite user content is formed by two distinct parts: dynamic user content and static user content. We have previously mentioned dynamic user content and static user content but we will also discuss it here in relation to specific embodiments.

The first display 2 has been described as being particularly adapted/suitable for displaying content that requires rapid updating, such as movies, clips, animations, news/information ticker, etc. This type of content to be provided is actively changing from one moment to the next. We call this type of content "dynamic user content" due to its "dynamic" and constantly changing nature. As discussed above, the first display 2 is most suited for displaying this type of content, at least in part because an active display has little difficulty in displaying rapidly changing content.

The second display has been described as being particularly adapted/suitable for displaying content that does not change much over time, such as text, stationary images, backgrounds, etc. This type of content to be provided does not change much from one moment to the next (unlike dynamic user content). We call this type of content "static user content" due its "static" and unchanging nature. As discussed above, the second display is most suited for displaying this type of content, at least in part because it does not require constant application of power to keep content displayed.

Returning to the embodiment shown in FIG. 2a, the composite user content to be provided is separated into its constituent parts by the processor 4. For example, composite content could be a webpage on a news site containing a video and accompanying text. In such a situation, there is clearly content within the composite content to be provided that is "dynamic", i.e. the video, and there is clearly content that is "static", i.e. the text.

The composite content, now split, is routed separately to the two displays 2, 3 by the processor 4. As the first display 2 is most suitable (out of the two display types) for displaying dynamic user content, the dynamic user content is routed to the first display 2. Similarly, as the second display 3 is most suitable (again, out of the two display types) for displaying static user content, the static user content is routed to the second display 3.

FIG. 2a shows a separation of the first display 2 and the second display 3 in this embodiment. It can be seen that the first display 2 provides an animation (dynamic user content or "rich" user content) whilst the second display 3 just provides the accompanying text (static user content, which can be considered to be comparatively simple content). Though these displays are separately providing parts of the composite user content, their respective provided contents are viewable simultaneously by a user.

This is depicted in the display combination 2, 3 illustrated on the far right of FIG. 2a. The dynamic content provided by the first display 2 and the static content provided by the second display 3 therefore sum together visually to provide the composite content.

By separating the composite content into its constituent parts and routing them to appropriate displays this takes advantage of the respective advantages of the two display types.

In this embodiment, the text is displayed by a display type that does not require power to constantly display unchanging content (static) rather than using a display that does require constant application of power. This consequently saves power over using an active display. Similarly, the animation is displayed by a display type that can easily provide such dynamic content, rather than using a display that would struggle to provide such content (like the second display type). Specifically, the advantage of utilising the passive reflective display for static content is applied just to the static content, and the advantage of utilising the active light emitting display for dynamic content is applied just to the dynamic content, thereby achieving the advantages of both whilst avoiding the disadvantages of just using one or the other.

FIG. 2b illustrates another operational mode. In some situations, it is more suitable to provide all the user content to just the first display 2. For example, in situations where there is a great deal more content to be displayed that lies off-screen, i.e. where scrolling may be necessary (the content to be displayed is but a subset/selection of a much larger set/area of content). Therefore, whilst text is typically static user content, when scrolling occurs the position of text on the display may be rapidly changing. As such, it would be classed as dynamic user content for the purposes of displaying the text.

In another situation, it may be that backlighting of the content is necessary. In such a situation it would be advantageous to utilise the backlighting capabilities of the apparatus to illuminate the provided user content. The operational mode shown in FIG. 2b is directed towards such situations, where it is more suitable to provide all the user content to the first display 2.

In this mode, all the user content (dynamic as well as 'static') is provided to the first display 2, whilst the second display 3 contributes no additional content. Therefore, complete composite content to be displayed is provided by the first display 2. This is to take advantage of the first display's 2 ability to rapidly update displayed content.

Alternatively, there are sometimes situations in which there may be difficulty in viewing all content when it is provided to the first display 2 only. FIG. 2c illustrates another operational display mode suitable for such situations. The example shown in FIG. 2c shows that the text (static content) to be provided in some situations may be a light colour on a light background. This is not immediately suitable for displaying as in the operational mode of FIG. 2a or 2b. As can be seen in the illustration of the separate first display 2 (left), this can often appear washed out and hard to view (for example, in very bright environments or where very pale colours on pale backgrounds are to be displayed).

To correct for this, the second display 3 is configured to provide further static content that visually contrasts the content being displayed by the first display 2. In this mode, the second display 3 provides a blacked out complementary area that acts as a 'backing area' for the content to be displayed on the first display 2. In other embodiments, this 'backing/contrast' content provided on the second display 3 can be exactly complementary to the content being provided on the first display 2 (for example, the inverse image of the content being provided on the first display 2).

This complementary content acts to provide a strong contrasting background behind the content on the first display 2. As can be seen from the complete composite content provided by the display combination 2, 3 (right), this contrasting static content provided by the second display 3 helps to ensure that the content provided by the first display 2 is easily viewable.

This mode is particularly suitable for environments where the ambient light does not allow for easy viewing of content to be provided, or in situations where the content to be displayed does not lend itself well to either of the above two operational modes.

FIG. 2d illustrates a further operational mode of the displays of the apparatus 100. As mentioned in the discussion of the above two operational modes, sometimes there are situations where it is more suitable to route all user content to one of the displays. For example, many devices exist for the reading or writing of electronic material such as e-books, news articles, essays, or used for writing such text based items. These devices often display a full page of text (as from a physical book) that remains on screen for a great deal of time whilst the user reads the text. In such situations, the user may not physically be operating the device (using buttons, watching an animation, etc) but would still be using it. In such e-book/e-reader embodiments, there would be little or no dynamic user content to be displayed, rather there would likely just be static user content.

In this operational mode, the apparatus 100 is configured to only provide static user content, and to provide this using only the second display 3. This allows the apparatus 100 to, in effect, "indefinitely" display content such as text without continuously drawing power and while allowing the user to continue to view the displayed text. This can allow the apparatus 100 to function like an e-book reader, or e-reader device.

In other embodiments, a screensaver may be employed with a clock, or the date, or a stationary message, etc. This mode is also suitable for this. In any situations where the user would only be interested in static user content, this mode can be engaged to utilise just the second display 3 and thereby save power.

In still other embodiments, when the apparatus 100 detects that the user may not be actively using the apparatus 100 (for example, when there has been an absence of user input for a sustained period of time), the processor 4 may be configured to cease providing dynamic user content but to leave static user content displayed on the second display 3 as it does not require continued or additional power to do so. The apparatus 100 may be configured to leave this mode and restore a different mode of operation when it determines/considers that the user has resumed operation of the apparatus (for example, when it detects user input).

In this embodiment, the touch screen functionality/capability of the first display 2 is used to control the provision of user content to the two displays 2, 3. For example, the processor 4 may be configured to, upon detection of specific touch user input applied to the first display 2, change the user content provided to the two displays to another source of user content, or to change the display mode, or to deactivate/activate/reactivate one or both of the displays.

In other embodiments, to further enhance this touch screen functionality, the apparatus may also comprises a haptic feedback module (not shown). This module is configured to provide a short abrupt physical vibration in response to touch input received by the first display. This physical vibration (or haptic feedback) creates the impression that a physical button has been depressed/activated in response to touch user input, which would not normally elicit such a physical response. This can be used as an indication to the user that the input has been successfully detected and received by the apparatus.

It should be noted that whilst the first display 2 is configured to receive for touch user input, in other embodiments this need not be the case. For example, the apparatus may be used in conjunction with (i.e. may comprise, be connected to) a physical user interface (not shown) such as an actual keypad, keyboard, etc in place of the touch functionality of the first display. This physical user interface may be used to control the content provided to the two displays as per the operation of the touch sensitive first display in the first embodiment.

In other embodiments (not shown) the apparatus may also comprise a tilt sensor configured to detect when the orientation of the apparatus is changed. In such embodiments, the processor may be configured to, upon detection of a change in orientation of the apparatus, change the orientation of the content on the display displays to compensate for the change in orientation. For example, when the apparatus is turned through 90', the content on the screen is turned through 90' by the processor to compensate for the change in orientation (such as portrait to landscape, or vice versa).

In still other embodiments (see FIG. 7) the apparatus may comprise additional displays. For example, there may be two transparent displays (702, 702') overlying and covering the reflective second display so as to provide for additional content that can contribute towards the overall composite content.

Figure 7:
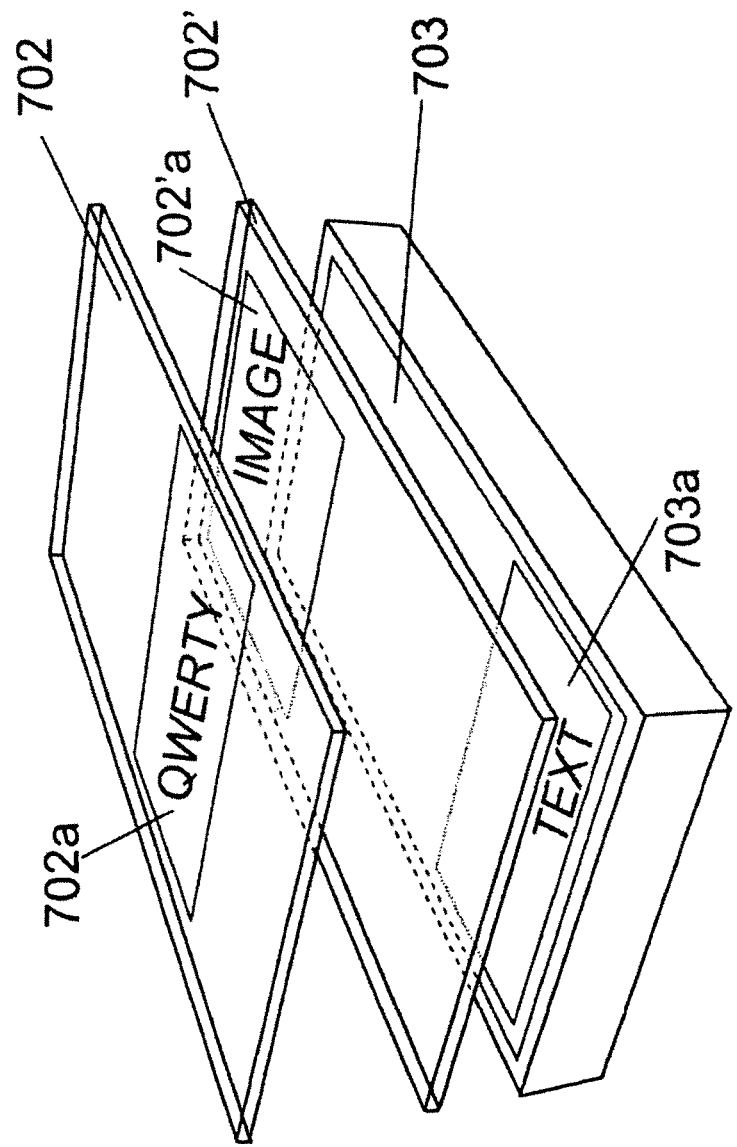
FIG. 7 illustrates a further variation of the first embodiment utilising two transparent displays.

For example, as illustrated in FIG. 7, transparent display 702 can provide for alphabetic QWERTY type input on area (displaying a corresponding QWERTY keyboard on area 702a), transparent display 702' can provide for a full colour image on area 702'a, and display 703 can provide for text content on area 703a. These three displays are then layered such that the respective areas of content are overlaid on top of one another to provide for total composite user content in one perceived display area.

Other embodiments depicted in the figures have been provided with reference numerals that correspond to similar features of earlier described embodiments. For example, feature number 1 can also correspond to numbers 101, 201 etc. These numbered features may appear in the figures but may not have been directly referred to within the description of these particular embodiments. These have still been provided in the figures to aid understanding of the further embodiments, particularly in relation to the features of similar earlier described embodiments.

We will now describe a second embodiment with reference to FIGS. 3a & 3b.

The apparatus 200 is substantially the same as the apparatus 100 of the first embodiment but with the following differences.

The housing 201 is split into a first part 201a and a second part 201b. The first part 201a and the second part 201b have the same length and width as each other but have slightly differing heights (relative to the figure), the first part 201a being shallower than the second part 201b.

The first part 201a comprises sliding rails (not shown) configured to mate with complementary grooves (not shown) comprised by the second part 201b. This sliding rail/groove arrangement has not been shown in the figures or described in detail, as such arrangements are well known in the art, (for example, see known slide-type mobile phones). This arrangement is merely described for the purpose of understanding that the first and second parts are movable relative to one another such that they can be positioned away from each other as shown in the figures.

The rails are dimensioned to be of similar dimensions to the grooves to allow for sliding. The rails and grooves are also formed from the same material as the first and second parts 201a, 201b during injection moulding of the housing 201. The rails and the grooves are also polished so as to have a low co-efficient of friction against one another. This is to allow for sliding of the first and second parts 201a, 201b relative to each other once they are assembled.

The sliding rails each comprise respective defined ends that are configured to mate with corresponding defined ends of the complementary grooves. This is to allow the sliding movement of the first part 201a relative to the second part to be terminated upon inter-engagement of the ends of the rails with the ends of the grooves. The ends are positioned such that a first point of termination of sliding occurs when the first part would be positioned to completely overlie the second part 201b (as per FIG. 3a), and such that a second point of termination occurs when the first part 201a would be positioned to have the right end of the first part 201*a* just overlying the left end of the second part 201*b* (relative to FIGS. 3*a* & 3*b*, and as per FIG. 3*b*).

The first part 201*a* has an aperture (as per the aperture in the first embodiment) in the top surface that passes all the way through the first part. As in the first embodiment, the aperture is shaped and dimensioned to match the first display 202 and has a rim that runs around the walls of the aperture so as to be able to receive the first display 202. The second part 201*b* also has an aperture in the top surface (as per the first embodiment) that is shaped and dimensioned to match the second display 203, also comprising a rim that runs around the walls of the aperture so as to be able to receive the first display 203. The apertures of the first and second parts 201*a*, 201*b* are shaped and positioned so that they match up with one another when the first part 201*a* will be positioned to overlie the second part 201*b* completely (as per the first point of termination of sliding discussed above).

The first display 202 is mounted within the corresponding aperture of the first part 201*a*, and the second display 203 is mounted in the corresponding aperture of the second part 201*b*. This is done so that the displays 202, 203 are mounted in the same fashion as in the first embodiment of apparatus 100.

We will now describe the functionality of this embodiment.

The sliding arrangement of the rails and grooves of the apparatus 200 allows the first part 201*a* to be positioned to completely overlie the second part 201*b* at the first point of sliding termination. This defines a first configuration in which the apparatus 200 is in a substantially monoblock form factor, and wherein the aperture of the first part 201*a* matches up with the aperture of the second part 201*b*. This means that the first display 202 will completely and precisely overlie the second display 203 in the first configuration.

The sliding arrangement of the apparatus 200 also allows the first part 201*a* to be slidably moved so as to be positioned away from the second part 201*b* such that the right end (relative to the figures) of the first part 201*a* just overlies the left end of the second part 201*b* at the above-described second point of sliding termination. This is shown in FIG. 3*b*. This defines a second configuration in which the apertures (and therefore the displays) are no longer overlying or overlapping, but instead the two displays 202, 203 are totally exposed and available for direct viewing by a user. It should be noted that the second display 203 is no longer only viewable through the first display, but is directly viewable in this configuration.

By providing the two displays in separate parts of the housing (parts 201*a*, 201*b*), the second embodiment of the apparatus 200 is able to be moved from a first configuration in which the apparatus 200 can provide all the advantages of the first embodiment 100, to a second configuration in which the displays are separately viewable so as to be able to provide separate content. This content can be simultaneously viewable (as in the first embodiment) but as the displays 202, 203 do not overlap, they do not provide for composite content in the way that the displays of the first embodiment combined to provide a single perceived display.

By providing for this additional second configuration, the apparatus 200 can provide for additional functionality. For example, in one embodiment, the first display 202 could provide for full size animated images on its display area, and the second display 203 could provide for uninterrupted text across its display area. In another embodiment, the two displays 202, 203 can be combined to provide for an increased display area, providing continuous content that extends across both screens.

In the second embodiment, the first and second parts 201*a*, 201*b* are slidably movable relative to one another in one direction. In other embodiments, the parts 201*a*, 201*b* may be slidably movable in more than one direction, or they may be rotatably movable, tiltable, foldable (see FIG. 8), or they even be separated into two distinct parts. The two parts 201*a* 201*b* may also communicate via wired communication (as per the first and second embodiments) or via wireless communication in any of these variations.

Also, in this embodiment, the first and second 201*a*, 201*b* are physically moved from one configuration to another by a user. In other embodiments, they may be mechanically moved from one configuration to another, for example via spring mechanisms, or rack and pinion and arrangements, or by motorised mechanisms.

Furthermore, whilst there are only two configurations mentioned in this embodiment, the skilled person will appreciate that there may be other embodiments in which the apparatus can adopt more than two configurations, in which the first and second parts 201*a*, 201*b* are repositioned relative to one another. In variations of the second embodiment, the sliding rail/groove arrangement may comprise mateable detents that allow for further configurations between the points of sliding termination, these additional configurations being defined by predetermined positioning of the two parts 201*a*, 201*b* relative to one another via the mating of the provided detents.

In still further embodiments, the first and second parts 201*a*, 201*b* may even be continuously movable between different relative positions, to thereby provide an 'infinite' number of configurations.

In a variation of the second embodiment, the first display 202 is (as per the first embodiment) configured to be able to receive touch user input in the first configuration (but not the second configuration), and the second display 203 is configured to be able to receive touch user input in the second configuration (but it does not do so, or rather cannot do so, in the first configuration as it is covered by the first display 202). The second display 203 is configured such that, in the second configuration, it displays a QWERTY keypad (or, in other embodiments, a numeric or alphanumeric keypad, or an audio/visual type interface for controlling media or games) and to be able to receive touch user input corresponding to the input types displayed in its surface (i.e. a user presses a 'Q' and the second display recognises that a 'Q' has been pressed). This provides for an apparatus that is configured to act in a similar fashion to a PDA when in the first configuration (the touch input being provided by the first display 202 in this configuration) and an apparatus that is also configured to act like a slide-type keyboard phone in the second configuration (the touch input being provided by the second display 203 in the second configuration).

The input that is received via the touch interface of the second display 203 may or may not be provided on either and/or both of the first and second displays 202, 203.

A specific embodiment of this is shown in FIG. 8. This shows an example where the first part 801*a* is foldable relative to the second part 801*b* to define a first closed configuration in which the first part 801*a* completely overlies the second part 801*b*, and a second open configuration in which the first part 801*a* is unfolded (in a similar fashion to a laptop or book) relative to the second part 801*b*. The first closed configuration operates in substantially the same way as the first configuration of the second embodiment illustrated in FIG. 3*a*. However, in the second open configuration, what was previously the top face 850 of the first display 802 is no longer the top face, but could be considered to be a bottom face. The reverse face 851 of the first display 802, (that was previously directly opposing the top face of the second display 803), is now exposed for viewing. As such, the apparatus 800 is configured to provide user content on the new topmost area of the first display 802, provided by the reverse face 851 of the first display 802. This enables the second display 803 to allow for user input, whilst the first display 802 is still able to provide user content in the second open configuration, despite being reversed. The top face 850 may or may not provide user content in the first closed configuration. The top face 850 may or may not provide user content in the second open configuration.

Figure 4:
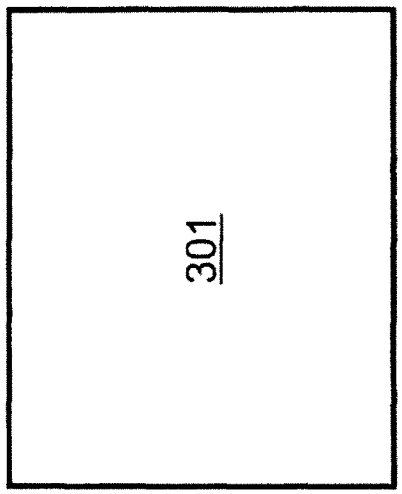
FIG. 4 shows a flowchart illustrating the method of controlling the displays to provide user content as provided by a computer program stored on a computer readable medium.

In all of the above-described embodiments, separate content is provided to the first and second displays. The processor 4 is responsible for controlling the provision of such content to each of the displays. With reference to FIG. 4, the processor is configured to:

301—control the user content to be displayed on the first and second displays. This processor is configured to separate out composite content to be provided into separate streams of content for the first and second displays. The processor then provides the content to the respective displays via the electrical connections, so that the displays can provide this content to a user (in any configuration). In other embodiments, the composite content may already have been separated into dynamic and static streams/parts, such that the processor need only provide the separate content to the respective displays.

The processor is also configured in some embodiments to select/apply certain operational modes (as described above with reference to FIGS. 2a-2d). For example, depending on the nature of the content to be provided the processor may select the operational mode in FIG. 2a instead of the operational mode of FIG. 2b. In one particular, embodiment (not shown), the processor is connected to an ambient light sensor which detects ambient light levels. The processor is configured to measure ambient light levels and select an appropriate operational mode based on the detected ambient light levels.

Figure 5:
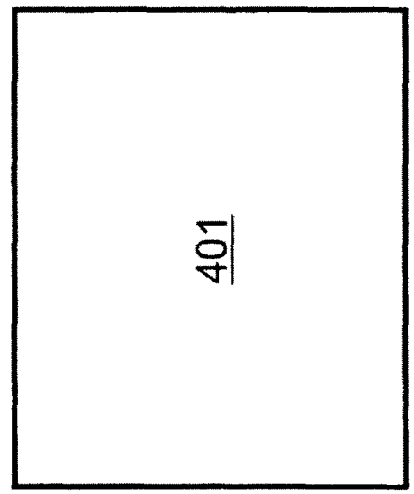
FIG. 5 shows a flowchart illustrating the method of assembly of the apparatus.

We have discussed the method of assembly of the various embodiments above. FIG. 5 illustrates a flowchart of this method of assembly. FIG. 5 shows that the apparatus is assembled using a method involving:

401—assembling the apparatus to provide for a position where the first display at least partially overlies the second display to provide a covered region of the second display such that the content on the second display in the covered region can be viewed through the first display.

Figure 6:
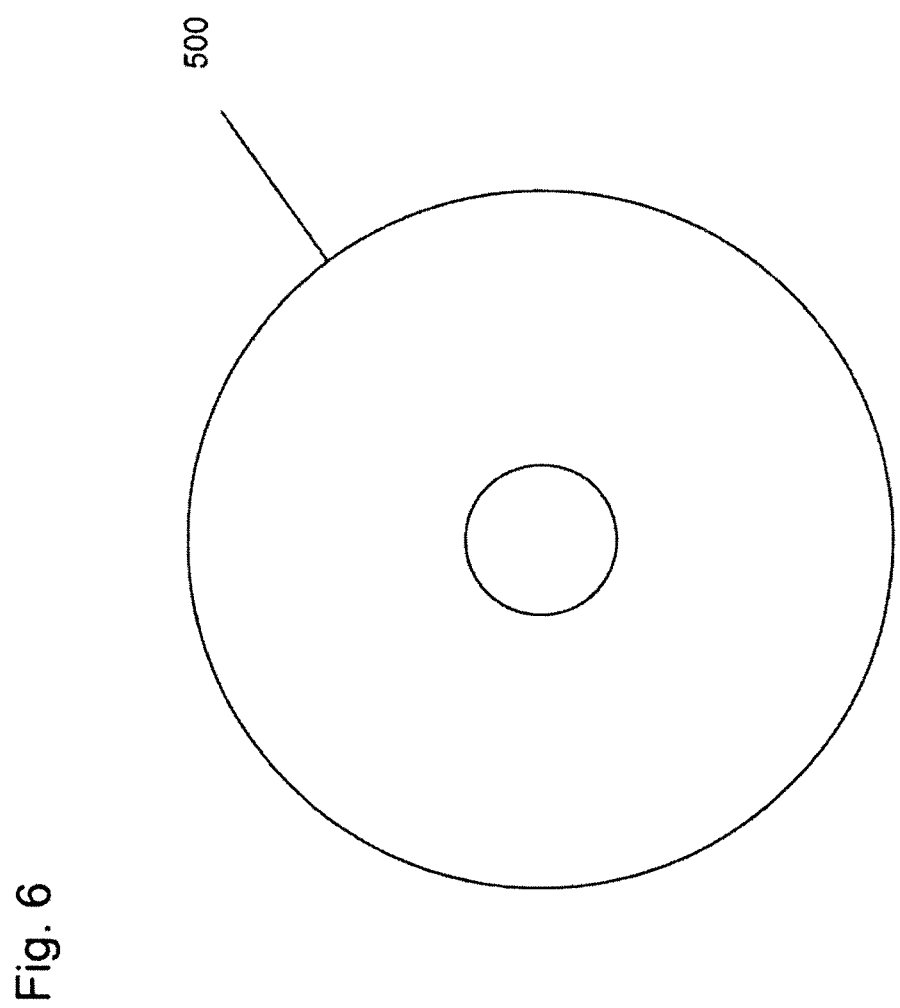
FIG. 6 illustrates schematically a computer readable medium providing a program according to an embodiment of the present invention.

FIG. 6 illustrates schematically a computer/processor readable media 500 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
  a first display configured to be able to display user content and to have an active display state in which said user content can be stably displayed via active powering of the display;
  a second display configured to be able to display user content and to have a passive display state in which said user content can be stably displayed without active powering of the second display,
  wherein the apparatus is configured such that the first display is positioned to at least partially overlie and cover the second display to provide a covered region of the second display and is also configured such that the content on the second display in the covered region can be viewed through the first display; and
  a processor connected to the first and second displays, where, when there has been an absence of user input to the apparatus for a period of time, the processor is configured to provide a mode of operation to cease providing the user content to the first display and to leave the user content displayed on the second display, and the processor is configured to restore a different mode of operation when the processor determines that a user input has occurred,
  where the apparatus comprises a first closed configuration defined by the positioning of the first display to at least partially overlie and cover the second display, and wherein the apparatus also comprises a second open configuration, the apparatus being configured such that, when in the second open configuration, the first display is positioned to be moved away from the second display to provide a revealed region of the second display to allow the content of the second display in the revealed region to be directly viewable.

2. The apparatus as claimed in claim 1, wherein the first display is configured to be transparent/translucent to thereby allow the content in the covered region of the second display to be viewable through the first display.

3. The apparatus as claimed in claim 1, wherein the apparatus is configured such that user content of the second display in the covered region is viewable through the first display, the user content of both displays thereby being viewable together to provide for composite user content.

4. The apparatus as claimed in claim 3, wherein the apparatus is configured such that the user content of the second display in the covered region contrasts/is complementary to the user content of the first display to improve the viewability of the composite user content.

5. The apparatus as claimed in claim 3, wherein the composite user content comprises substantially dynamic user content and substantially static user content, the first display being configured to be able to provide at least the substantially dynamic user content, the second display being configured to be able to provide the substantially static user content.

6. The apparatus as claimed in claim 5,
  wherein the first display is configured to provide at least substantially dynamic user content selected from the list of: colour images, videos, motion clips, and/or information tickers, and
  wherein the second display is configured to provide substantially static user content selected from the list of: unchanging images, text, backgrounds, textures, a clock face or display, e-book pages, and/or web browsers.

7. The apparatus as claimed in claim 5, wherein the apparatus is configured to comprise a hybrid active display mode in which:
  the dynamic content is displayed via the first display in its active state to thereby provide for active updating of the dynamic user content to be displayed, and
  the static content is displayed via the second display in its passive display state to also save power.

8. The apparatus as claimed in claim 1, wherein the apparatus is configured such that the first and second displays are configured such that they can be moved away from one another by one or more of: relative sliding, rotation, folding, or separation.

9. The apparatus as claimed in claim 1, wherein the apparatus is configured such that:
  in the first closed configuration, the first display is also configured to be able to receive touch user input; and
  in the second configuration, the second display is also configured to be able to receive touch user input.

10. A portable electronic device for displaying user content comprising the apparatus of claim 1.

11. An e-book device for displaying text-based user content comprising the apparatus of claim 1.

12. A method of assembly of an apparatus, the method comprising:
  assembling the apparatus to provide for a position where a first display at least partially overlies a second display to provide a covered region of the second display such that the content on the second display in the covered region, having a passive display state in which said user content is stably displayed without active powering of the second display, can be viewed through the first display,
  where the first and second displays are movably connected to each other between a first closed configuration and a second open configuration, where in the first closed configuration the first display at least partially overlies and covers the second display, and the apparatus is configured such that, when in the second open configuration the first display is at least partially moved away from the second display to provide a revealed region of the second display to allow the content of the second display in the revealed region to be directly viewable, and
  connecting a processor to the first and second displays, where, when there has been an absence of user input to the apparatus for a period of time, the processor is configured to provide a mode of operation to cease providing the user content to the first display and to leave the user content displayed on the second display, and the processor is configured to restore a different mode of operation when the processor determines that a user input has occurred wherein the apparatus comprises the first display configured to be able to display user content and to have an active display state in which said user content can be stably displayed via active powering of the display; and
  the second display configured to be able to display user content and to have the passive display state in which said user content can be stably displayed without active powering of the second display, wherein the apparatus is configured such that the first display is positioned to at least partially overlie the second display to provide the covered region of the second display and is also configured such that the content on the second display in the covered region can be viewed through the first display.

13. A non-transitory computer readable medium comprising executable computer code stored thereon, the code being configured to, when run, perform a method of controlling the user content to be displayed on displays of an apparatus, the apparatus comprising:
   a first display configured to be able to display user content and to have an active display state in which said user content can be stably displayed via active powering of the display; and
   a second display configured to be able to display user content and to have a passive display state in which said user content can be stably displayed without active powering of the second display, wherein the apparatus is configured such that the first display is positioned to at least partially overlie the second display to provide a covered region of the second display and is also configured such that the content on the second display in the covered region can be viewed through the first display, the method comprising:
   controlling the user content to be displayed on the first and second displays including the second display having the passive display state in which said user content can be stably displayed without active powering of the second display,
   where the first and second displays are movably connected to each other between a first closed configuration and a second open configuration, where in the first closed configuration the first display at least partially overlies and covers the second display, and the apparatus is configured such that, when in the second open configuration the first display is at least partially moved away from the second display to provide a revealed region of the second display to allow the content of the second display in the revealed region to be directly viewable,
   where a processor of the apparatus is connected to the first and second displays, where, when there has been an absence of user input to the apparatus for a period of time, the processor is configured to provide a mode of operation to cease providing the user content to the first display and to leave the user content displayed on the second display, and the processor is configured to restore a different mode of operation when the processor determines that a user input has occurred.

14. A method comprising:
   displaying first user content on a first display via an active display state in which the first user content is displayed by an active powering of the first display;
   displaying second user content on a second display via a passive display state in which the second user content is stably displayed without active powering of the second display,
   where the first display at least partially overlies the second display, and where the first display is transparent and the second user content is displayed on the second display such that the second user content displayed on the second display in the passive display state is viewable by a user through the first display,
   where the first and second displays are movably connected to each other between a first closed configuration and a second open configuration, where in the first closed configuration the first display at least partially overlies and cover the second display, and the apparatus is configured such that, when in the second open configuration the first display is at least partially moved away from the second display to provide a revealed region of the second display to allow the content of the second display in the revealed region to be directly viewable where a processor of the apparatus is connected to the first and second displays, where, when there has been an absence of user input to the apparatus for a period of time, the processor is configured to provide a mode of operation to cease providing the user content to the first display and to leave the user content displayed on the second display, and the processor is configured to restore a different mode of operation when the processor determines that a user input has occurred.

15. A method as in claim 14 where the second user content is displayed on the second display as a first static content, and the method further comprises changing the second user content to a second static content, and then displaying the second static content on the second display in the passive display state in which the second static content is stably displayed without active powering of the second display.

\* \* \* \* \*